United States Patent
Song et al.

(10) Patent No.: US 9,602,813 B2
(45) Date of Patent: Mar. 21, 2017

(54) IMAGE ENCODING/DECODING DEVICE AND METHOD, AND REFERENCE PICTURE INDEXING DEVICE AND METHOD

(75) Inventors: Jinhan Song, Seoul (KR); Jeongyeon Lim, Gyeonggi-do (KR); Joohee Moon, Seoul (KR); Yunglyul Lee, Seoul (KR); Haekwang Kim, Seoul (KR); Byeungwoo Jeon, Gyeonggi-do (KR); Jongki Han, Seoul (KR); Juock Lee, Seoul (KR); Hyoungmee Park, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 809 days.

(21) Appl. No.: 13/817,408

(22) PCT Filed: Aug. 18, 2011

(86) PCT No.: PCT/KR2011/006087
§ 371 (c)(1),
(2), (4) Date: Apr. 10, 2013

(87) PCT Pub. No.: WO2012/023817
PCT Pub. Date: Feb. 23, 2012

(65) Prior Publication Data
US 2013/0315311 A1    Nov. 28, 2013

(30) Foreign Application Priority Data

Aug. 18, 2010 (KR) .................. 10-2010-0079591
Aug. 18, 2011 (KR) .................. 10-2011-0082181

(51) Int. Cl.
*H04N 19/105* (2014.01)
*H04N 19/533* (2014.01)
(Continued)

(52) U.S. Cl.
CPC ..... *H04N 19/00606* (2013.01); *H04N 19/105* (2014.11); *H04N 19/157* (2014.11); *H04N 19/176* (2014.11)

(58) Field of Classification Search
CPC ..... H04N 7/36; H04N 19/1887; H04N 19/105
See application file for complete search history.

(56) References Cited

U.S. PATENT DOCUMENTS 6,611,559 B1 * 8/2003 Shingo ................. H04N 5/145
348/E5.066
9,124,898 B2 * 9/2015 Tsai ....................... H04N 19/52
(Continued)

FOREIGN PATENT DOCUMENTS

| KR | 1020010084661 | 9/2001 |
| KR | 1020050028025 | 3/2005 |
| KR | 1020050078257 | 8/2005 |

OTHER PUBLICATIONS

International Search Report mailed Apr. 4, 2012 for PCT/KR2011/006087, citing the above reference(s).

*Primary Examiner* — Christopher Findley
(74) *Attorney, Agent, or Firm* — Hauptman Ham, LLP

(57) ABSTRACT

The present disclosure provides an image encoding/decoding apparatus and method, and a reference picture indexing apparatus and method. The reference picture indexing apparatus includes: a candidate reference picture setting unit for setting candidate reference pictures; a priority order determining unit for determining a priority order of the candidate reference pictures set by the candidate reference picture setting unit, according to a current block to be encoded; and a reference picture indexing unit for adaptively indexing a reference picture according to the current block based on the priority order determined by the priority order determining unit.

25 Claims, 10 Drawing Sheets

(51) Int. Cl.
*H04N 19/176* (2014.01)
*H04N 19/157* (2014.01)

(56) References Cited

U.S. PATENT DOCUMENTS

| | | | |
|---|---|---|---|
| 2007/0009038 A1* | 1/2007 | Kim | H04N 19/51 |
| | | | 375/240.16 |
| 2007/0047649 A1* | 3/2007 | Suzuki | H04N 19/61 |
| | | | 375/240.15 |
| 2008/0063075 A1* | 3/2008 | Kondo | H04N 19/105 |
| | | | 375/240.16 |

* cited by examiner

IMAGE ENCODING/DECODING DEVICE AND METHOD, AND REFERENCE PICTURE INDEXING DEVICE AND METHOD

TECHNICAL FIELD

The present disclosure in one or more embodiments relates to an image encoding/decoding apparatus and method, and a reference picture indexing apparatus and method. More particularly, the present disclosure relates to an image encoding apparatus and method, and a reference picture indexing apparatus and method in the field of B-picture coding, P-picture coding, inter prediction-based coding, and the like, which can select an actually optimal reference picture with respect to a current block or an arbitrary unit to be encoded by adaptively indexing reference pictures according to the current block in consideration of a quantization parameter, a partition type of the current block, a size of the current block, an SAD (sum of absolute difference) between a current picture and reference pictures, and the like. In addition, the present disclosure relates to an image decoding apparatus and method which can improve the reconstruction efficiency of a current block to be decoded by reconstructing the current block by adaptively selecting a reference picture according to the current block, based on index information extracted from a bitstream, in consideration of a quantization parameter, a partition type of the current block, a size of the current block, an SAD between a current picture and reference pictures, and the like.

BACKGROUND

The statements in this section merely provide background information related to the present disclosure and may not constitute prior art.

Moving Picture Experts Group (MPEG) and Video Coding Experts Group (VCEG) together stepped ahead of the existing MPEG-4 Part 2 and H.263 standard methods to develop a better and more excellent video compression technology. The new standard is called H.264/AVC (Advanced Video Coding) and was released simultaneously as MPEG-4 Part 10 AVC and ITU-T Recommendation H.264.

In such a video compression method, in order to encode an image, each picture is divided into predetermined image processing units, for example, predetermined sized blocks, and the respective blocks are encoded by using inter prediction or intra prediction. In this case, an optimal encoding mode is selected in consideration of a data size and a block distortion degree, and the block is encoded according to the optimal encoding mode selected.

The inter prediction is a method for compressing an image by removing the temporal redundancy between pictures, and a typical example of the inter prediction is a motion estimation coding method. The motion estimation coding method estimates the motion of a current picture in units of a block by using at least one reference picture, and predicts each block based on the motion estimation result.

In order to predict a current block, the motion estimation coding method uses a predetermined evaluation function to search for a block most similar to the current block within a predetermined search range of the reference picture. When similar blocks are searched out, only residual data between the similar blocks in the reference picture and the current block is encoded and transmitted, thereby increasing data compression ratio.

FIG. 1 is a diagram illustrating a method for predicting blocks of a current picture by using a plurality of reference pictures according to related art. Referring to FIG. 1, a plurality of pictures 120, 130 and 140 may be referred to in order to predict blocks 112, 114 and 116 included in a current picture P(n) 110. The picture P(n-1) 120 is located immediately before the current picture P(n) 110 to be the picture temporally closest to the current picture, and a time interval with respect to the current picture P(n) 110 increases toward the picture P(n-2) 130, the picture P(n-3) 140, etc.

Since a plurality of reference pictures are searched for in order to predictively encode the blocks 112, 114 and 116 included in the current picture P(n) 110, reference blocks 122, 132 and 142 used to predict the blocks of the current picture may be from different pictures. FIG. 1 illustrates the case where prediction is performed with reference to the pictures temporally preceding the current picture 110. However, when the current picture 110 is a B-picture (bidirectional predictive picture), not only the pictures temporally preceding the current picture but also the pictures temporally trailing the current picture may be used to predict the current picture 110.

The blocks 112, 114 and 116 of the current picture 110 are predicted to generate respective residual blocks. Then, the residual blocks of the respective blocks 112, 114 and 116, their motion vectors, and reference picture indexes may be encoded to encode the blocks included in the current picture 110. Herein, the reference picture index is information for specifying which of the reference pictures is used for inter prediction.

The conventional hierarchical B-picture based video coding method using hierarchical B-picture is adapted to add a temporal scalability function to a block-based video coding scheme used in the international video standard such as MPEG-1, MPEG-2, MPEG-4 Part 2 Visual, MPEG-4 Part 10 AVC, or ITU-T H.264 in the same way as a block-based MCTF (motion compensated temporal filtering) method, by performing hierarchical predictive encoding with the use of a conventional B-picture for bidirectional motion prediction.

FIG. 2 is a diagram illustrating a general hierarchical B-picture coding structure. As illustrated in FIG. 2, in the case of a hierarchical B-picture coding structure using seven B-pictures, a general hierarchical B-picture coding method sets up potential reference pictures in units of a GOP (group of pictures), and performs reference picture indexing by an inter-picture distance in units of a picture depending on the number of pictures that remain as reference pictures among the potential reference pictures. Herein, the potential reference pictures are I, P and B pictures, and a 'b' picture is not used as a reference picture. Thus, the I, P and B pictures among the pictures encoded before a current picture to be encoded are set as reference pictures, and reference picture indexing is performed in the ascending order of distance from the current picture. When four reference pictures are appointed and the current picture is the picture 7, a picture encoding order is 0→8→4→2→1→3→6→5→7→16→12→9→11→14→13→15 . . . . Therefore, when the outstanding picture to encode is the picture 7 with pictures 0, 1, 2, 3, 4, 5, 6 and 8 already encoded, the potential reference pictures are the I picture of picture 0, the P picture of picture 8, and the B pictures of pictures 2, 4 and 6. Thus, reference picture indexing is performed with respect to each reference picture direction according to the distances between the picture 7 and the pictures 0, 2, 4, 6 and 8, which may be represented as Table 1.

TABLE 1

| Direction | Ref_Index | | | |
|---|---|---|---|---|
| | 0 | 1 | 2 | 3 |
| L0 | 6 | 4 | 2 | 8 |
| L1 | 8 | 6 | 4 | 2 |

However, since this reference picture indexing method is to find a reference picture by identically indexing identical candidate reference pictures, it may fail to get the very best reference picture to provide the highest coding efficiency for the current block or an arbitrary unit.

DISCLOSURE

Technical Problem

Therefore, to solve the above-mentioned problems, the present disclosure seeks to provide an image encoding apparatus and method, and a reference picture indexing apparatus and method in the field of B-picture coding, P-picture coding, inter prediction-based coding, and the like, which can select an actually optimal reference picture with respect to a current block to be encoded or an arbitrary unit by adaptively indexing reference pictures according to the current block in consideration of a quantization parameter, a partition type of the current block, a size of the current block, an SAD between a current picture and reference pictures, and the like.

The present disclosure also seeks to provide an image decoding apparatus and method which can improve the reconstruction efficiency of a current block to be decoded by reconstructing the current block by adaptively selecting a reference picture according to the current block, based on index information extracted from a bitstream, in consideration of a quantization parameter, a partition type of the current block, a size of the current block, an SAD between a current picture and reference pictures, and the like.

SUMMARY

An embodiment of the present disclosure provides an image encoding/decoding apparatus including: an image encoder for determining a priority order of candidate reference pictures according to a current block to estimate a motion vector of the current block, adaptively indexing a reference picture based on the priority order determined, and transmitting index information of the reference picture; and an image decoder for determining a priority order of candidate reference pictures according to the current block to decode the current block and reconstructing the current block to be decoded, by using the index information extracted from a bitstream based on the priority order determined.

Another embodiment of the present disclosure provides an image encoding apparatus including: an image encoder for determining a motion vector of a current block and predictively encoding the current block by using the motion vector determined; and a reference picture indexer for determining a priority order of candidate reference pictures according to the current block to estimate the motion vector and adaptively indexing a reference picture based on the priority order determined.

Yet another embodiment of the present disclosure provides a reference picture indexing apparatus for indexing a reference picture to estimate a motion vector, including: a candidate reference picture setting unit for setting candidate reference pictures; a priority order determining unit for determining a priority order of the candidate reference pictures set by the candidate reference picture setting unit, according to a current block to be encoded; a reference picture indexing unit for adaptively indexing a reference picture according to the current block based on the priority order determined by the priority order determining unit; and an index encoding unit for encoding an index of the reference picture indexed by the reference picture indexing unit.

Herein, the candidate reference picture setting unit may set the candidate reference pictures in a B-picture coding structure.

Alternatively, the candidate reference picture setting unit may set the candidate reference pictures in a P-picture coding structure.

Alternatively, the candidate reference picture setting unit may set the candidate reference pictures in an arbitrary inter prediction-based coding unit.

In addition, the priority order determining unit may determine the priority order of the candidate reference pictures based on at least one of a quantization parameter, a partition type of the current block, a size of the current block, an SAD between a current picture and the reference picture, an inter-picture distance, an SSE (sum of square error), a direction of the reference picture, an interpolation resolution of the reference picture, and an encoding resolution of the reference picture.

In addition, the priority order determining unit may determine the priority order of the candidate reference pictures based on a quantization parameter when a partition type of the current block is equal to or larger than a predetermined size, and determine the priority order of the candidate reference pictures based on a distance between a current picture and the reference picture when the partition type of the current block is smaller than the predetermined size.

In addition, the priority order determining unit may determine the priority order of the candidate reference pictures in ascending order of an SAD between a current picture and the candidate reference pictures.

For reference pictures set in a B-picture coding structure or for encoding by bidirectional prediction in inter prediction, the priority order determining unit may index the reference picture without discrimination between an L0 direction and an L1 direction.

Yet another embodiment of the present disclosure provides an image decoding apparatus including: a reference picture indexer for decoding index information extracted from a bitstream, determining a priority order of candidate reference pictures according to a current block to be decoded, and determining a reference picture based on the index information and the priority order determined; and an image decoder for reconstructing the current block based on the reference picture determined.

Herein, the reference picture indexer may determine the priority order of the candidate reference pictures based on at least one of a quantization parameter, a partition type of the current block, a size of the current block, an SAD between a current picture and the reference picture, an inter-picture distance, an SSE, a direction of the reference picture, an interpolation resolution of the reference picture, and an encoding resolution of the reference picture.

Yet another embodiment of the present disclosure provides a reference picture indexing apparatus used in an image decoder, including: a candidate reference picture setting unit for setting candidate reference pictures; a priority order determining unit for determining a priority order of the candidate reference pictures set by the candidate reference picture setting unit, according to a current block to be decoded; a reference picture indexing unit for adaptively indexing a reference picture according to the current block based on the priority order determined by the priority order determining unit; and an index decoding unit for decoding index information extracted from a bitstream, wherein the reference picture is determined based on an index of the reference picture indexed and the index information decoded.

Herein, the candidate reference picture setting unit may set the candidate reference pictures in a B-picture coding structure.

In addition, the candidate reference picture setting unit may set the candidate reference pictures in a P-picture coding structure.

In addition, the candidate reference picture setting unit may set the candidate reference pictures in an inter prediction-based coding structure.

In addition, the priority order determining unit may determine the priority order of the candidate reference pictures based on at least one of a quantization parameter, a partition type of the current block, a size of the current block, an SAD between a current picture and the reference picture, an inter-picture distance, an SSE, a direction of the reference picture, an interpolation resolution of the reference picture, and an encoding resolution of the reference picture.

In addition, the priority order determining unit may determine the priority order of the candidate reference pictures based on a quantization parameter when a partition type of the current block is equal to or larger than a predetermined size, and determine the priority order of the candidate reference pictures based on a distance between a current picture and the reference picture when the partition type of the current block is smaller than the predetermined size.

In addition, the priority order determining unit may determine the priority order of the candidate reference pictures in ascending order of an SAD between a current picture and the candidate reference pictures.

Yet another embodiment of the present disclosure provides an image encoding/decoding method including: determining a priority order of candidate reference pictures according to a current block to estimate a motion vector of the current block, adaptively indexing a reference picture based on the priority order determined, and transmitting index information of the reference picture; and determining a priority order of candidate reference pictures according to the current block to decode the current block and reconstructing the current block to be decoded, by using the index information extracted from a bitstream based on the priority order determined.

Yet another embodiment of the present disclosure provides an image encoding method including: setting candidate reference pictures; determining a priority order of the candidate reference pictures according to a current block to estimate a motion vector; adaptively indexing a reference picture based on the priority order determined; determining a motion vector of the current block based on the reference picture indexed; and predictively encoding the current block by using the motion vector determined.

The candidate reference picture may be encoded in units of a slice, an image, or a picture. In addition, the priority order of the candidate reference picture may be encoded in units of a slice, an image, or a picture.

Yet another embodiment of the present disclosure provides a reference picture indexing method for indexing a reference picture to estimate a motion vector, including: setting candidate reference pictures; determining a priority order of the candidate reference pictures set, according to a current block to be encoded; adaptively indexing a reference picture according to the current block based on the priority order determined; and encoding an index of the reference picture indexed.

Herein, the process of setting the candidate reference pictures may set the candidate reference pictures in a B-picture coding structure.

In addition, the process of setting the candidate reference pictures may set the candidate reference pictures in a P-picture coding structure.

In addition, the process of setting the candidate reference pictures may set the candidate reference pictures in an arbitrary inter prediction-based coding unit. In addition, the process of determining the priority order may determine the priority order of the candidate reference pictures based on at least one of a quantization parameter, a partition type of the current block, a size of the current block, an SAD between a current picture and the reference picture, an inter-picture distance, an SSE, a direction of the reference picture, an interpolation resolution of the reference picture, and an encoding resolution of the reference picture.

In addition, the process of determining the priority order may determine the priority order of the candidate reference pictures based on a quantization parameter when a partition type of the current block is equal to or larger than a predetermined size, and determine the priority order of the candidate reference pictures based on a distance between a current picture and the reference picture when the partition type of the current block is smaller than the predetermined size.

In addition, the process of determining the priority order may determine the priority order of the candidate reference pictures in ascending order of an SAD between a current picture and the candidate reference pictures.

For reference pictures set in a B-picture coding structure or for encoding by bidirectional prediction in inter prediction, the process of determining the priority order may index the reference picture without discrimination between an L0 direction and an L1 direction.

Yet another embodiment of the present disclosure provides an image decoding method including: decoding index information extracted from a bitstream; adaptively determining a priority order of candidate reference pictures based on the index information according to a current block to be decoded; and reconstructing the current block based on a reference picture corresponding to the priority order determined.

Herein, the process of determining the priority order may determine the priority order of the candidate reference pictures based on at least one of a quantization parameter, a partition type of the current block, a size of the current block, an SAD between a current picture and the reference picture, an inter-picture distance, an SSE, a direction of the reference picture, an interpolation resolution of the reference picture, and an encoding resolution of the reference picture.

ADVANTAGEOUS EFFECTS

According to the present disclosure as described above, the image encoding apparatus and method, and the reference picture indexing apparatus and method in the field of B-picture coding, P-picture coding, inter prediction-based coding, and the like can select an actually optimal reference picture with respect to a current block to be encoded or an arbitrary unit by adaptively indexing reference pictures according to the current block in consideration of a quantization parameter, a partition type of the current block, a size of the current block, an SAD between a current picture and reference pictures, and the like.

In addition, the image decoding apparatus and method can improve the reconstruction efficiency of a current block to be decoded by reconstructing the current block by adaptively selecting a reference picture according to the current block, based on index information extracted from a bitstream, in consideration of a quantization parameter, a partition type of the current block, a size of the current block, an SAD between a current picture and reference pictures, and the like.

REFERENCE NUMERALS

Figure 1:
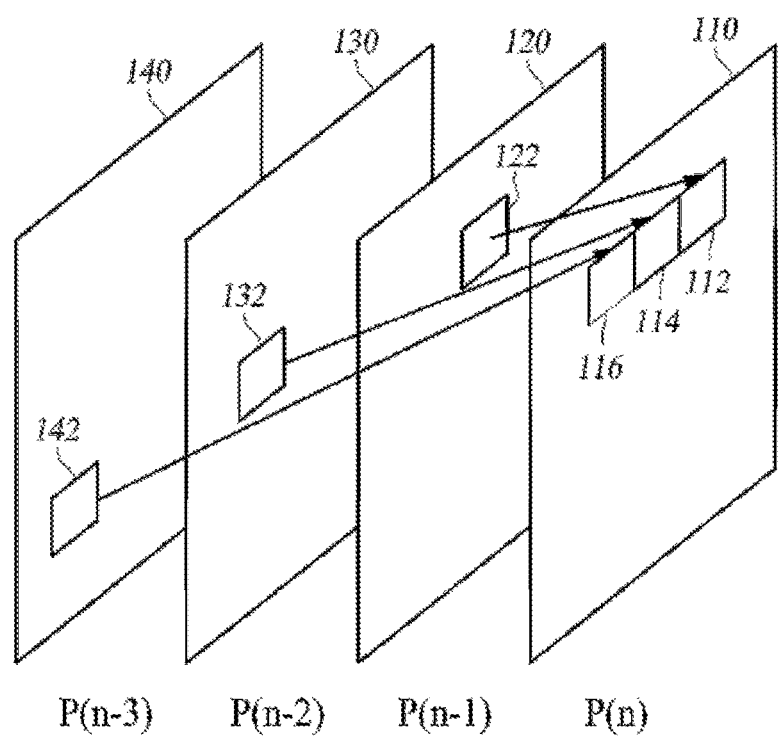
FIG. 1 is a diagram illustrating a method for predicting blocks of a current picture by using a plurality of reference pictures according to related art.

300: Image encoding apparatus
310: Reference picture indexer
320: Image encoder
312: Candidate reference picture setting unit
314: Priority order determining unit
316: Reference picture indexing unit

DETAILED DESCRIPTION

Figure 3:
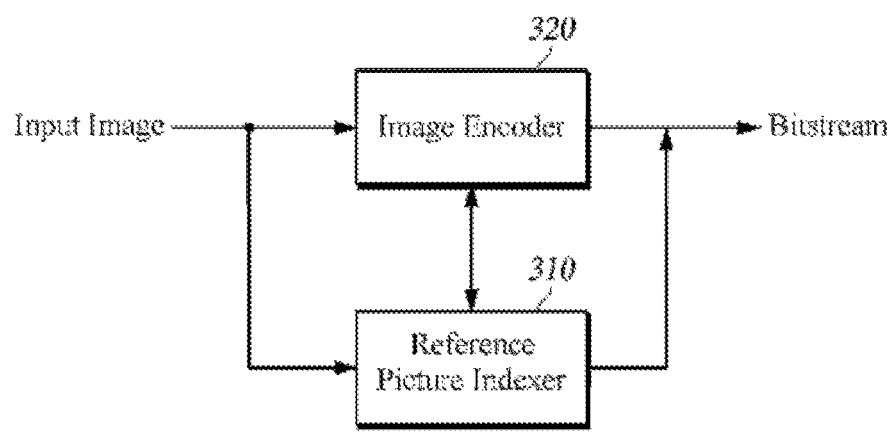
FIG. 3 is a diagram schematically illustrating an image encoding apparatus according to an embodiment of the present disclosure.

FIG. 3 is a diagram schematically illustrating an image encoding apparatus according to an embodiment of the present disclosure. An image encoding apparatus 300 according to an embodiment of the present disclosure may include a reference picture indexer 310 and an image encoder 320.

The reference picture indexer 310 determines the priority order of candidate reference pictures according to a current block to estimate a motion vector of the current block, and adaptively indexes a reference picture based on the priority order determined. The reference picture indexer 310 will be described below in detail with reference to FIG. 4.

The image encoder 320 determines a current motion vector being a motion vector of a current block, and predictively encodes the current block by using the current motion vector determined. In this way, the current block is predictively encoded to generate image data.

To this end, the image encoder 320 may include a predictor, a subtractor, a transformer/quantizer, and an encoder, and may further include an inverse quantizer/transformer, an adder, a deblocking filter, a memory, and the like. Herein, the predictor determines a current motion vector by estimating a motion of a current block, and generates a predicted block by compensating the motion of the current block by using the current motion vector. The subtracter generates a residual block by subtracting the predicted block from the current block. The transformer/quantizer generates a quantized transform coefficient by transforming/quantizing the residual block. The encoder generates image data by encoding the quantized transform coefficient. In addition, the inverse quantizer/transformer reconstructs the residual block by inversely quantizing/transforming the quantized transform coefficient. The adder reconstructs the current block by adding the predicted block and the residual block reconstructed. The current block reconstructed is deblocking-filtered by the deblocking filter, and the result is accumulated in the memory in units of a picture, and is used to predict the next block or next picture. The respective components of the image encoder 320 are not the subject matter of the present disclosure, and thus a detailed description thereof will be omitted herein.

Figure 4:
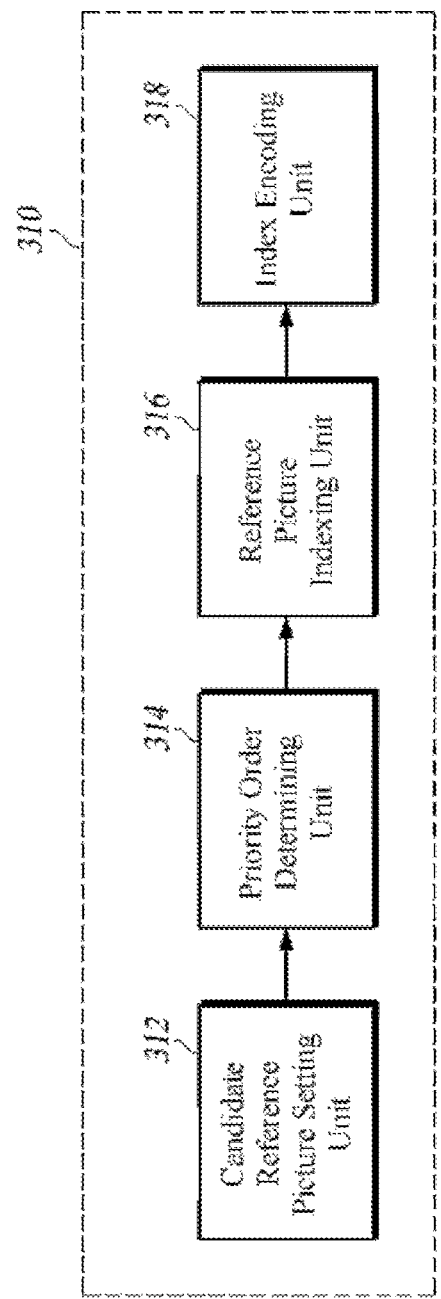
FIG. 4 is a diagram schematically illustrating an example of a reference picture indexing apparatus according to an embodiment of the present disclosure.

FIG. 4 is a diagram schematically illustrating an example of a reference picture indexing apparatus according to an embodiment of the present disclosure. The reference picture indexing apparatus according to an embodiment of the present disclosure may be implemented as the reference picture indexer 310 of the image encoding apparatus 300 described above with reference to FIG. 3. Hereinafter, for the convenience of description, the reference picture indexing apparatus according to an embodiment of the present disclosure will be referred to as the reference picture indexer 310.

The reference picture indexer 310 may include a candidate reference picture setting unit 312, a priority order determining unit 314, a reference picture indexing unit 316, and an index encoding unit 318.

Figure 2:
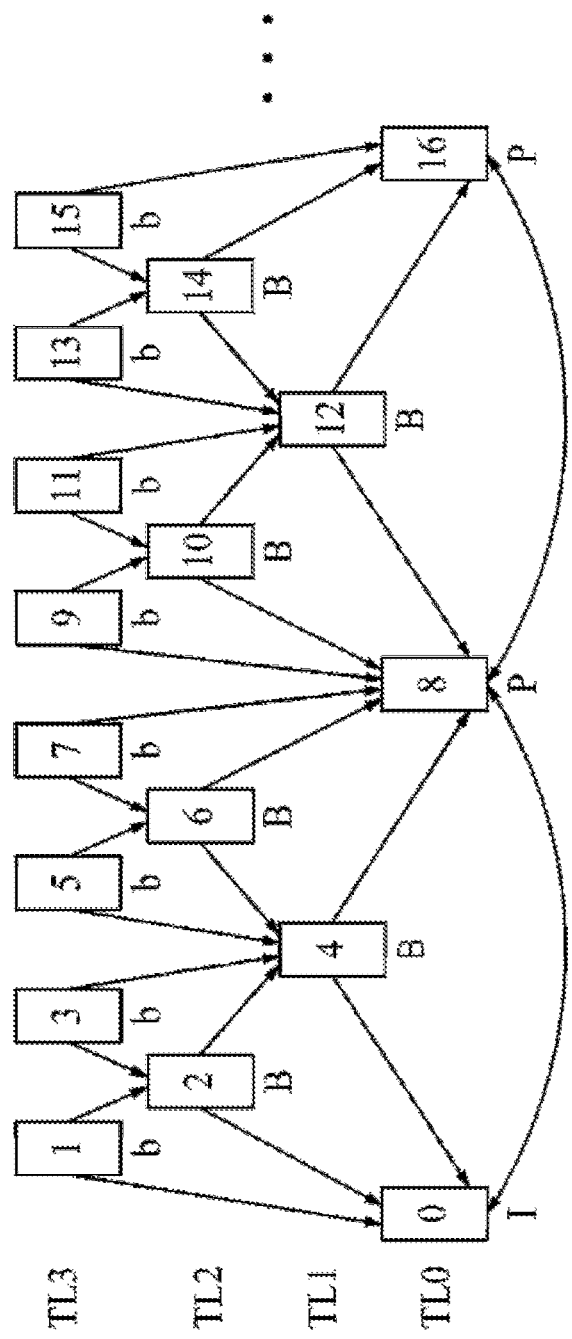
FIG. 2 is a diagram illustrating an example of a hierarchical B-picture coding structure.

The candidate reference picture setting unit 312 sets candidate reference pictures. Herein, the candidate reference picture setting unit 312 may set the candidate reference pictures in hierarchical B-picture coding structure. That is, a hierarchical B-picture coding structure supporting temporal scalability may be used for scalable video coding (SVC). A hierarchical B-picture coding scheme is based on a closed-loop structure as a temporal decomposition structure for supporting various temporal resolutions, and has a decomposition level according to temporal scalability. Hierarchical B-picture coding of scalable video coding may obtain temporal scalability by inserting a B-picture between VP pictures which are key pictures. As illustrated in FIG. 2, the candidate reference picture setting unit 312 may set a GOP structure as a hierarchical B-picture coding structure having a GOP size of 8 ($=2^N$, N=3). Herein, N may be represented by an integer, and may be encoded by a bitstream having a total of (N+1) temporal resolutions. However, the GOP size is not limited thereto, and various modifications may be made thereto.

The priority order determining unit 314 determines a priority order of the candidate reference pictures set by the candidate reference picture setting unit 312, according to a current block to be encoded. In this case, the priority order determining unit 314 may determine the priority order of the candidate reference pictures based on at least one of a quantization parameter, a partition type of the current block, a size of the current block, and an SAD between a current picture and the reference picture.

The reference picture indexing unit 316 adaptively indexes a reference picture according to the current block based on the priority order determined by the priority order determining unit 314. For example, with respect to the candidate reference pictures set in a hierarchical B-picture coding structure as illustrated in FIG. 2, if a I-picture quantization parameter is 22; a P-picture quantization parameter is 24; a B-picture quantization parameter 23 and a b-picture quantization parameter is 26, then the priority order determining unit 314 may determine the priority order based on the quantization parameters. In this case, if the current picture is the picture 7 and four reference pictures are selected, the reference picture indexing unit 316 may index the reference pictures as shown in Table 2.

TABLE 2

| Direction | Ref_Index | | | |
|---|---|---|---|---|
| | 0 | 1 | 2 | 3 |
| L0 | 6 | 4 | 2 | 0 |
| L1 | 8 | 0 | 6 | 4 |

Herein, in the case of an L1 direction, only the picture 8 may be used as the reference picture in principle. However, the already-encoded pictures 0, 6 and 4 may be used as the reference pictures in order to increase the coding efficiency.

Alternatively, when encoding is performed in units of a block or an arbitrary unit, that is, in units of an arbitrary unit other than a picture unit by using different quantization parameters, a current block to be encoded or an arbitrary unit using a quantization parameter lower than a quantization parameter in units of an arbitrary unit may be used as a reference picture, and candidates thereof may be indexed based on a quantization parameter or an arbitrary basis.

In addition, the priority order determining unit 314 may determine the priority order of the candidate reference pictures based on a quantization parameter when a partition type of the current block is equal to or larger than a predetermined size, and determine the priority order of the candidate reference pictures based on a distance between a current picture and the reference picture when the partition type of the current block is smaller than the predetermined size. For example, with respect to the candidate reference pictures set in a hierarchical B-picture coding structure as illustrated in FIG. 2, if a size thereof based on a partition type of the current block to be encoded is equal to or larger than 16×16 blocks, the priority order determining unit 314 may determine the priority order based on the quantization parameter. If the size is equal to or smaller than 16×8 or 8×16 blocks and the priority order is determined based on an inter-picture distance, a value of the quantization parameter is the same as described above. If a current picture to be encoded is the picture 7 and the size of the current block is 8×8, the reference picture indexing unit 316 may adaptively index the reference picture according to the size of the current block as illustrated in Table 3.

TABLE 3

| Direction | Ref_Index | | | |
|---|---|---|---|---|
| | 0 | 1 | 2 | 3 |
| L0 | 6 | 8 | 4 | 2 |
| L1 | 8 | 6 | 4 | 2 |

Herein, in the case of an L1 direction, only the picture 8 may be used as the reference picture in principle. However, the already-encoded pictures 6, 4 and 2 may be used as the reference pictures in order to increase the coding efficiency.

In addition, the priority order determining unit 314 may determine the priority order of the candidate reference pictures in ascending order of the SAD between the current picture and the candidate reference pictures. For example, with respect to the candidate reference pictures set in the hierarchical B-picture coding structure as illustrated in FIG. 2, when the priority order is determined based on the SAD and the picture including the current block to be encoded, if the current picture to be encoded is the picture 7 and the SAD between the current picture and the picture 7 ascends in the order of 4, 0, 8, 2, 5, the reference picture indexing unit 316 may determine that the picture of smaller SAD between the already-encoded picture and the current picture to be encoded has a higher priority order, and may index the reference picture as shown in Table 4.

TABLE 4

| Direction | Ref_Index | | | |
|---|---|---|---|---|
| | 0 | 1 | 2 | 3 |
| L0 | 4 | 0 | 2 | — |
| L1 | 8 | 4 | 0 | 2 |

Herein, in the case of an L1 direction, only the picture 8 may be used as the reference picture in principle. However, the already-encoded pictures 4, 0 and 2 may be used as the reference pictures in order to increase the coding efficiency.

It has been described above that the priority order of the reference picture with respect to the candidate reference pictures of the hierarchical B-picture coding structure is determined to index the reference picture. However, the same method may also be applied to a general coding structure, as well as to the hierarchical B-picture coding structure. For example, the candidate reference picture setting unit 312 may set the candidate reference pictures in an IPPP coding structure illustrated in FIG. 5, and adaptively index the reference picture according to the current block to be encoded, in units of an arbitrary unit on an arbitrary basis.

Figure 5:
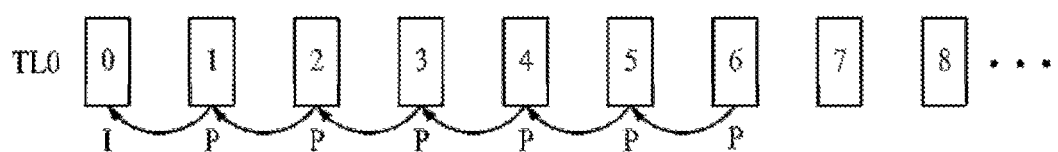
FIG. 5 is a diagram illustrating an example of an IPPP coding structure.

For example, if four reference pictures are indexed based on the quantization parameter in the IPPP coding structure illustrated in FIG. 5, the I-picture quantization parameter has 22 to be encoded, and the P-picture quantization parameters have 23 and 24 to be alternately encoded. If the current picture to be encoded is the picture 5, the reference picture indexing unit 316 may select and index the reference picture as shown in Table 5.

TABLE 5

| Direction | Ref_Index | | | |
|---|---|---|---|---|
| | 0 | 1 | 2 | 3 |
| L0 | 3 | 1 | 0 | — |

Alternatively, when encoding is performed in units of a block or an arbitrary unit, that is, in units of an arbitrary unit other than a picture unit by using different quantization parameters, a current block to be encoded or an arbitrary unit using a quantization parameter lower than a quantization parameter in units of an arbitrary unit may be used as a reference picture, and candidates thereof may be indexed based on a quantization parameter or an arbitrary basis.

Alternatively, for example, with respect to the candidate reference pictures set in an IPPP coding structure as illustrated in FIG. 5, if a size thereof based on a partition type of the current block to be encoded is equal to or larger than 16×16 blocks, the priority order determining unit 314 may determine the priority order based on the quantization parameter. If the size is equal to or smaller than 16×8 or 8×16 blocks and the priority order is determined based on an inter-picture distance, the quantization parameter has the same value as described above. If a current picture to be encoded is the picture 5 and the current block is sized 8×8, the reference picture indexing unit 316 may adaptively index the reference picture according to the size of the current block as illustrated in Table 6.

TABLE 6

| Direction | Ref_Index | | | |
|---|---|---|---|---|
| | 0 | 1 | 2 | 3 |
| L0 | 4 | 3 | 2 | 1 |

Alternatively, with respect to the candidate reference pictures set in an IPPP coding structure as illustrated in FIG. 5, when the priority order is determined based on the SAD and the picture including the current block to be encoded, if the current picture to be encoded is the picture 5 and the SAD between the current picture and the picture 5 in ascending order runs as 3, 0, 4, 2, then the reference picture indexing unit 316 may determine that the picture of smaller SAD between the already-encoded picture and the current picture to be encoded has a higher priority order, and may index the reference picture as shown in Table 7.

TABLE 7

| Direction | Ref_Index | | | |
|---|---|---|---|---|
| | 0 | 1 | 2 | 3 |
| L0 | 3 | 0 | 4 | 2 |

When the candidate reference pictures are adaptively indexed in units of an arbitrary unit and the optimal reference picture is determined according to the above-described method, the index encoding unit 318 may encode the index of the reference picture by an arbitrary method. For example, the index of the reference picture having the highest priority order may be encoded through the priority order determining unit 314. The arbitrary method may include various methods such as truncated Exp-Golomb Coding, Unary Coding, Fixed Length Coding, and Context-based Coding. For example, when Fixed Length Coding is used, application may be made as shown in Table 8.

TABLE 8

| Bit String | Reference Index |
|---|---|
| 0 | 0 |
| 10 | 1 |

TABLE 8-continued

| Bit String | Reference Index |
|---|---|
| 11 | 2 |
| 100 | 3 |

In addition, for example, when context-based coding is used, binarization may first be performed by an arbitrary method as shown in Table 8. Herein, the binarization is a process of binarizing a reference index. Next, based on an arbitrary context, the binarization is arithmetically encoded. The arbitrary context may be a bit position or a reference index of a neighboring block.

Figure 6:
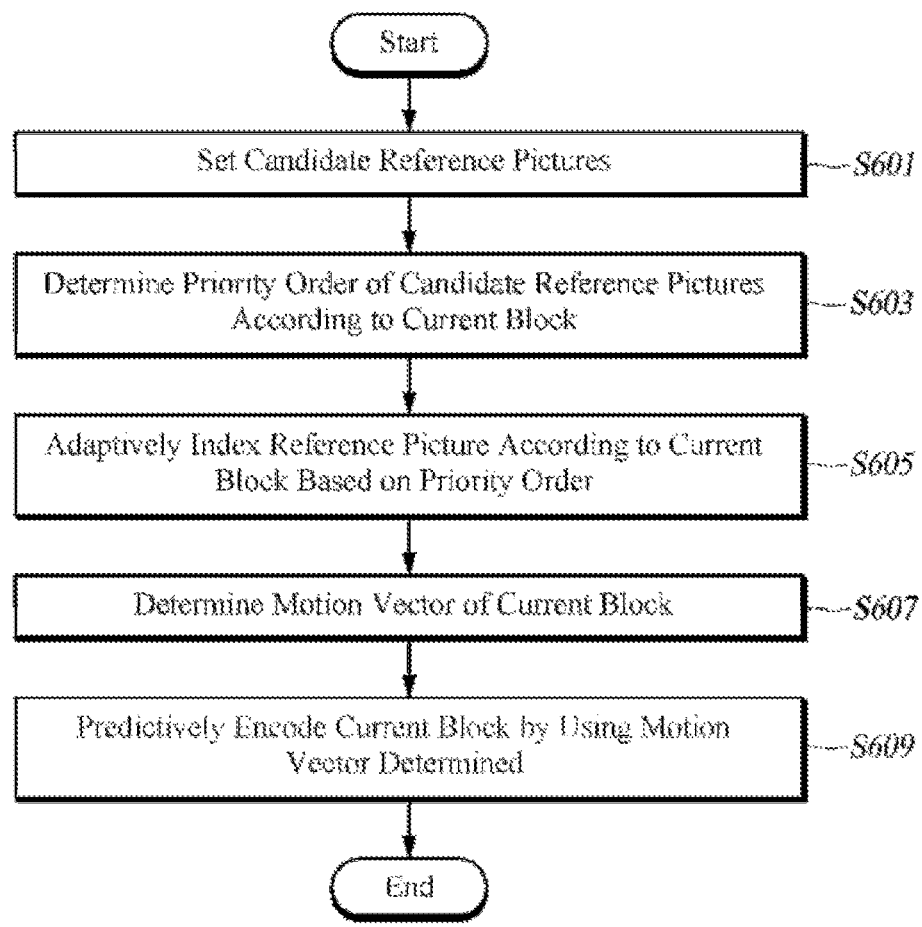
FIG. 6 is a flow diagram illustrating an image encoding method according to an embodiment of the present disclosure.

FIG. 6 is a flow diagram illustrating an image encoding method according to an embodiment of the present disclosure. The image encoding method according to an embodiment of the present disclosure may be performed by the image encoding apparatus 300 of FIG. 3.

Referring to FIG. 6, the candidate reference picture setting unit 312 sets candidate reference pictures in a hierarchical B-picture coding structure, an IPPP coding structure, or the like in step S601. The candidate reference picture setting unit 312 may set the candidate reference pictures in a B-picture coding structure, a P-picture coding structure, or an inter prediction-based coding structure.

The priority order determining unit 314 determines a priority order of the candidate reference pictures set by the candidate reference picture setting unit 312, according to a current block to be encoded (S603). Herein, the priority order determining unit 314 may determine the priority order of the candidate reference pictures based on at least one of a quantization parameter, a partition type of the current block, a size of the current block, and an SAD between a current picture and the reference picture. In addition, the priority order determining unit 314 may determine the priority order of the candidate reference pictures based on a quantization parameter when a partition type of the current block is equal to or larger than a predetermined size, and determine the priority order of the candidate reference pictures based on a distance between a current picture and the reference picture when the partition type of the current block is smaller than the predetermined size. In addition, the priority order determining unit 314 may determine the priority order of the candidate reference pictures in ascending order of SAD between the current picture and the candidate reference pictures.

The reference picture indexing unit 316 adaptively indexes a reference picture according to the current block based on the priority order determined by the priority order determining unit 314 (S605).

The index encoding unit 318 encodes the index of the reference picture generated by the reference picture indexing unit 318, and transmits a bitstream including the result to an image decoder 800.

The image encoder 320 may determine a motion vector of the current block based on the indexed reference picture (S607). Herein, the image encoder 320 may determine a motion vector of the current block based on the reference picture having the highest priority order.

In addition, the image encoder 320 predictively encodes the current block by using the motion vector determined (S609).

Figure 7:
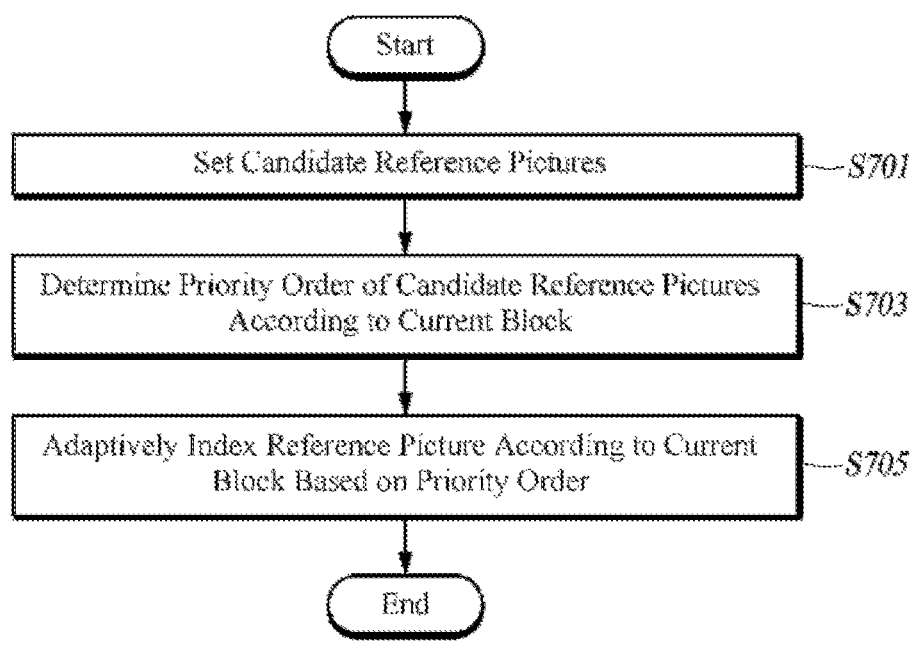
FIG. 7 is a flow diagram illustrating a reference picture indexing method according to an embodiment of the present disclosure.

FIG. 7 is a flow diagram illustrating a reference picture indexing method according to an embodiment of the present disclosure.

Referring to FIG. 7, the candidate reference picture setting unit 312 sets candidate reference pictures in a hierarchical B-picture coding structure, an IPPP coding structure, or the like (S701).

The priority order determining unit 314 determines a priority order of the candidate reference pictures set by the candidate reference picture setting unit 312, according to a current block to be encoded (S703). Herein, the priority order determining unit 314 may determine the priority order of the candidate reference pictures based on at least one of a quantization parameter, a partition type of the current block, a size of the current block, and SAD between a current picture and the reference picture. In addition, the priority order determining unit 314 may determine the priority order of the candidate reference pictures based on a quantization parameter when a partition type of the current block is equal to or larger than a predetermined size, and determine the priority order of the candidate reference pictures based on a distance between a current picture and the reference picture when the partition type of the current block is smaller than the predetermined size. In addition, the priority order determining unit 314 may determine the priority order of the candidate reference pictures in ascending order of an SAD between the current picture and the candidate reference pictures.

The reference picture indexing unit 316 adaptively indexes a reference picture according to the current block based on the priority order determined by the priority order determining unit 314 (S705). The index of the reference picture is encoded by the index encoding unit 318, and a bitstream including the result is transmitted to the image decoder 800.

Figure 8:
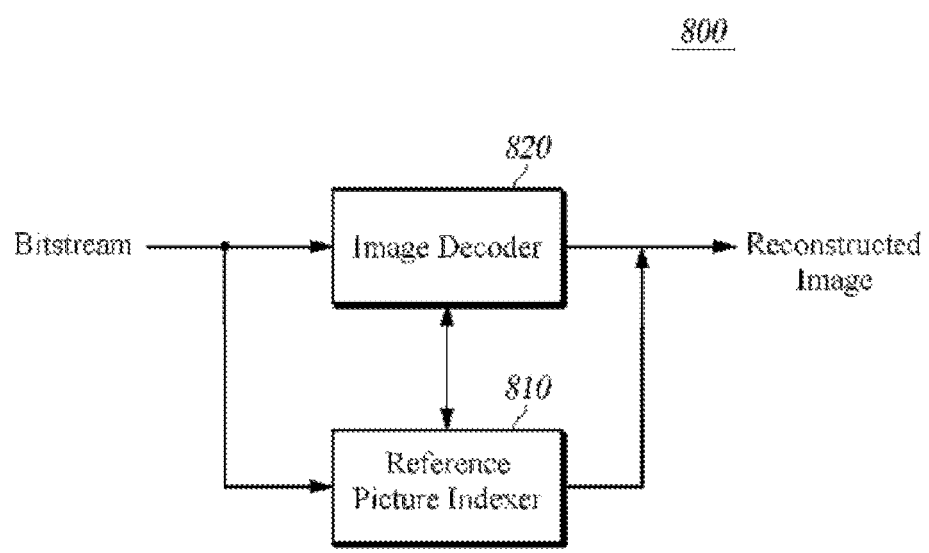
FIG. 8 is a diagram schematically illustrating an image decoding apparatus according to an embodiment of the present disclosure.

FIG. 8 is a diagram schematically illustrating an image decoding apparatus according to an embodiment of the present disclosure. Referring to FIG. 8, the image decoding apparatus according to an embodiment of the present disclosure may include a reference picture indexer 810 and an image decoder 820.

The reference picture indexer 810 decodes index information extracted from a bitstream, determines a priority order of candidate reference pictures according to a current block to be decoded, and adaptively determines a reference picture of the current block based on the index information and the priority order determined. For example, when the image encoding apparatus 300 encodes an image by adaptively indexing a reference picture based on a quantization parameter according to a current block, the reference picture indexer 810 may decode index information received from a bitstream, and determine a reference picture corresponding to the index information decoded from the reference picture indexed in the same way as the reference picture indexing method performed in the image encoding apparatus 300. In addition, when the image encoding apparatus 300 encodes an image by adaptively indexing a reference picture according to a current block based on a partition type of the current block to be encoded, the reference picture indexer 810 may determine a reference picture based on the index information received from a bitstream, in the same way as described above. In addition, when the image encoding apparatus 300 encodes an image by indexing a reference picture based on an SAD between a current picture and the reference picture, the reference picture indexer 810 may select the reference picture based on the reference picture index information transmitted through a slice header or an arbitrary header. In this manner, the reference picture indexer 810 may determine the priority order of the candidate reference pictures based on at least one of a quantization parameter, a partition type of a current block to be decoded, and a size of the current block, or may select the reference picture based on the index information.

The image decoder 820 reconstructs the current block based on the reference picture corresponding to the priority order of the reference picture determined by the reference picture indexer 810. A process of reconstructing the current block based on the reference picture is performed according to a conventional decoding process, and thus a detailed description thereof will be omitted.

Figure 9:
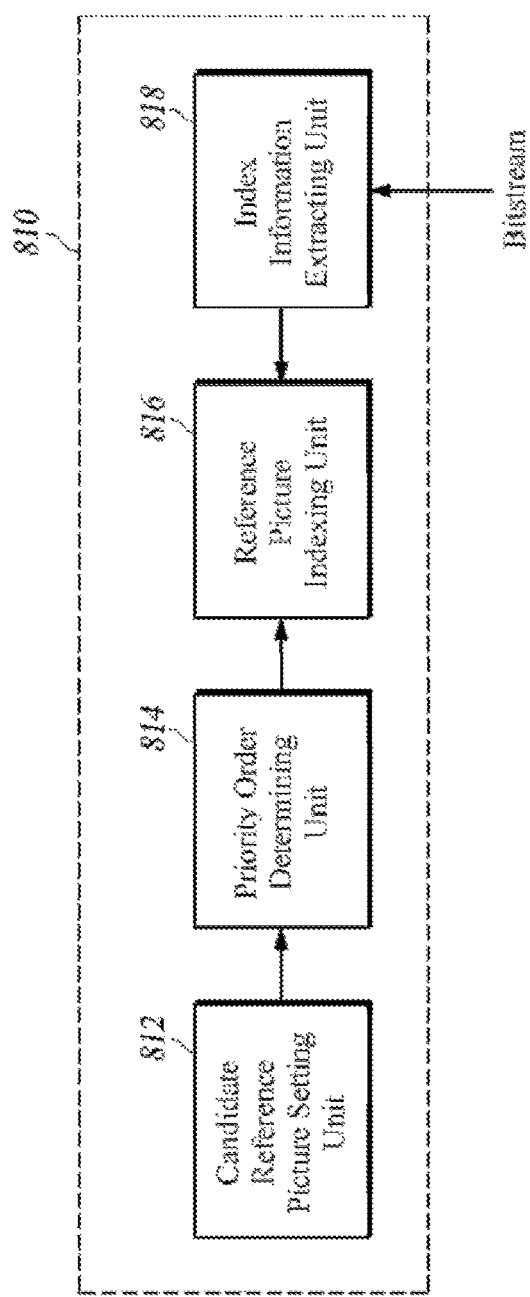
FIG. 9 is a diagram schematically illustrating an example of a reference picture indexing apparatus according to another embodiment of the present disclosure.

FIG. 9 is a diagram schematically illustrating a reference picture indexing apparatus according to another embodiment of the present disclosure. The reference picture indexing apparatus according to another embodiment of the present disclosure may be used as the reference picture indexer 810 of FIG. 8.

Referring to FIG. 9, the reference picture indexing apparatus 810 may include a candidate reference picture setting unit 812, a priority order determining unit 814, a reference picture indexing unit 816, and an index information extracting unit 818.

The candidate reference picture setting unit 812 sets candidate reference pictures for a current block to be decoded. The candidate reference picture setting unit 812 may set the candidate reference pictures in a B-picture coding structure, a P-picture coding structure, or an inter prediction-based coding structure.

The priority order determining unit 814 determines a priority order of the candidate reference pictures set by the candidate reference picture setting unit 812, according to the current block to be decoded. Herein, the priority order determining unit 814 may determine the priority order of the candidate reference pictures based on at least one of a quantization parameter, a partition type of the current block, a size of the current block, and an SAD between a current picture and a reference picture. In addition, the priority order determining unit 814 may determine the priority order of the candidate reference pictures based on a quantization parameter when a partition type of the current block is equal to or larger than a predetermined size, and determine the priority order of the candidate reference pictures based on a distance between the current picture and the reference picture when the partition type of the current block is smaller than the predetermined size. In addition, the priority order determining unit 814 may determine the priority order of the candidate reference pictures in ascending order of SAD between the current picture and the candidate reference pictures.

The reference picture indexing unit 816 adaptively indexes the reference picture according to the current block based on the priority order determined by the priority order determining unit 814.

The index information extracting unit 818 extracts index information from a bitstream received from the image encoder 300 and decodes the index information.

Herein, the reference picture indexing apparatus 810 determines the reference picture from the candidate reference pictures corresponding to the index information decoded by the index information extracting unit 818.

Figure 10:
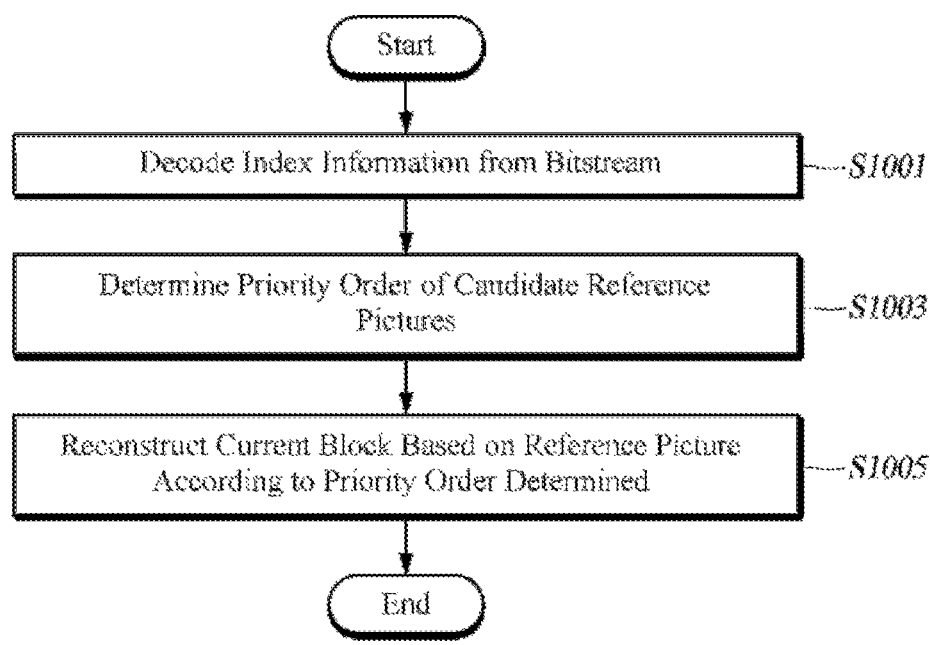
FIG. 10 is a flow diagram illustrating an image decoding method according to an embodiment of the present disclosure.

FIG. 10 is a flow diagram illustrating an image decoding method according to an embodiment of the present disclosure. Referring to FIG. 10, the reference picture indexer 810 decodes index information extracted from a bitstream (S1001). In addition, the reference picture indexer 810 adaptively determines a priority order of candidate reference pictures based on the decoded index information according to a current block to be decoded (S1003). For example, when the image encoding apparatus 300 encodes an image by adaptively indexing a reference picture based on a quantization parameter according to a current block, the reference picture indexer 810 may determine the reference picture based on the information received from the bitstream, in the same way as the reference picture indexing method performed in the image encoding apparatus 300. In addition, when the image encoding apparatus 300 encodes an image by adaptively indexing a reference picture according to a current block based on a partition type of the current block to be encoded, the reference picture indexer 810 may determine the reference picture based on the index information received from the bitstream, in the same way as described above. In addition, when the image encoding apparatus 300 encodes an image by indexing a reference picture based on the SAD between a current picture and a reference picture, the reference picture indexer 810 may select the reference picture based on the reference picture index information transmitted through a slice header or an arbitrary header. In this manner, the reference picture indexer 810 may determine the priority order of the candidate reference pictures based on at least one of a quantization parameter, a partition type of a current block to be decoded, and a size of the current block, or may select the reference picture based on the index information.

The image decoder 820 reconstructs the current block based on the reference picture corresponding to the priority order of the reference picture determined by the reference picture indexer 810 (S1005).

According to a second embodiment of the present disclosure, for reference pictures set in a B-picture coding structure or for encoding by bidirectional prediction in inter prediction, reference picture indexing may be performed without discrimination between an L0 direction and an L1 direction (hereinafter referred to as combined reference picture indexing). For example, with respect to the candidate reference pictures set in a hierarchical B-picture coding structure as illustrated in FIG. 2, if a I-picture quantization parameter is 22; a P-picture quantization parameter is 26 and a B-picture quantization parameter 30, then the priority order determining unit 314 may determine the priority order based on a quantization parameter, an inter-picture distance and a reference picture direction. Herein, if the current picture is the picture 5 and four reference pictures are selected, the reference picture indexing unit 316 may index the reference pictures as shown in Table 9.

TABLE 9

| | Ref_Index | | | |
|---|---|---|---|---|
| | 0 | 1 | 2 | 3 |
| Picture Number | 0 | 8 | 4 | 6 |

Herein, the encoder should encode whether the prediction is bidirectional prediction or not. When the prediction is not the bidirectional prediction, the encoder encodes a reference picture index with reference to Table 9. In the case of bidirectional prediction, the reference picture index may be encoded with reference to Table 9 or Table 2. This also applies to the hierarchical P-picture coding structure.

In addition, the encoder may encode information indicating the use of combined reference picture indexing into a slice header, a picture header, a sequence header, or the like. If the information is not encoded, the encoder and the decoder may use the combined reference picture indexing in the same manner, in the case of a B-picture. Alternatively, in the case of a hierarchical B-picture structure, the combined reference picture indexing may not be used in the case of a B-picture used as a reference picture, and the combined reference picture indexing may be used in the case of a b-picture that is not used as a reference picture. Alternatively, the combined reference picture indexing may be used in the case of a b-picture, and the combined reference picture indexing may not be used in the case of a B-picture.

In addition, the encoder and the decoder may perform the combined reference picture indexing through the same priority order determining unit 314, and the encoder may encode a reference picture indexing table in a picture header, a slice header, or the like.

Herein, instead of a quantization parameter, the priority order determining unit 314 may use the basis of an inter-picture distance, an SAD, an SSE (Sum of Square Error), a reference picture direction, a reference picture interpolation resolution, a reference picture encoding resolution, or the like. For example, with respect to candidate reference pictures set in a hierarchical B-picture coding structure as illustrated in FIG. 2, the priority order may be determined based on a reference picture direction and an inter-picture distance. Herein, if the current picture is the picture 5 and four reference pictures are selected, the reference picture indexing unit 316 may index the reference picture as shown in Tables 10, 11 and 12.

TABLE 10

| | Ref_Index | | | |
|---|---|---|---|---|
| | 0 | 1 | 2 | 3 |
| Picture Number | 4 | 2 | 0 | 6 |

In Table 10, direction L0 has the higher priority order.

TABLE 11

| | Ref_Index | | | |
|---|---|---|---|---|
| | 0 | 1 | 2 | 3 |
| Picture Number | 6 | 8 | 4 | 2 |

In Table 11, direction L1 has the higher priority order.

TABLE 12

| | Ref_Index | | | |
|---|---|---|---|---|
| | 0 | 1 | 2 | 3 |
| Picture Number | 4 | 6 | 2 | 8 |

In Table 12, with equal inter-picture distance, direction L0 has the higher priority order.

In these cases, the reference picture indexing unit 316 of the encoder and the reference picture indexing unit of the decoder may perform the same function.

In addition, encoding/decoding may be performed in different encoding/decoding methods according to whether the combined reference picture indexing is used for the respective pictures. For example, when the combined reference picture indexing is used, encoding/decoding is performed with reference to Table 8; and when the combined reference picture indexing is not used, the reference picture may be indexed as described in detail in the first embodiment of the present disclosure and encoding/decoding may be performed with reference to Table 13.

TABLE 13

| Bit | Ref_Index |
|---|---|
| 0 | 0 |
| 10 | 1 |
| 110 | 2 |
| 111 | 3 |

In addition, also in the case of context-based encoding/decoding, different contexts may be used according to whether Table 8 is used or Table 13 is used.

In addition, when the combined reference picture indexing is not used, L0 and L1 may be encode/decoded in different ways. For example, L0 is encoded/decoded with reference to Table 13, and L1 may be encoded/decoded with reference to Table 14.

TABLE 14

| Bit | Ref_Index |
|---|---|
| 1 | 0 |
| 01 | 1 |
| 001 | 2 |
| 000 | 3 |

Herein, even when the index encoding unit 318 uses a context to encode an index of the reference picture indexed by the reference picture indexing unit 316, or even when the index information extracting unit 818 decodes index information extracted from a bitstream, L0 using Table 13 and L1 using Table 14 may be based on different contexts.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. The computer readable media may include magnetic recording media, optical recording media, and carrier wave media.

Although exemplary embodiments of the present disclosure have been described for illustrative purposes, those skilled in the art will appreciate that various modifications, additions and substitutions are possible, without departing from essential characteristics of the disclosure. Therefore, exemplary embodiments of the present disclosure have not been described for limiting purposes. Accordingly, the scope of the disclosure is not to be limited by the above embodiments but by the claims and the equivalents thereof.

INDUSTRIAL APPLICABILITY

As described above, the present disclosure is highly useful for application in the field of B-picture coding, P-picture coding, inter prediction-based coding, and the like.

The image encoding apparatus and method, and the reference picture indexing apparatus and method according to the present disclosure can select an actually optimal reference picture with respect to a current block to be encoded or an arbitrary unit by adaptively indexing reference pictures according to the current block in consideration of a quantization parameter, a partition type of the current block, a size of the current block, an SAD between a current picture and reference pictures, and the like. In addition, the image decoding apparatus and method according to the present disclosure can improve the reconstruction efficiency of a current block to be decoded by reconstructing the current block by adaptively selecting a reference picture according to the current block, based on index information extracted from a bitstream, in consideration of a quantization parameter, a partition type of the current block, a size of the current block, an SAD between a current picture and reference pictures, and the like.

CROSS-REFERENCE TO RELATED APPLICATION

If applicable, this application claims priority under 35 U.S.C. §119(a) of patent application Ser. No. 10-2010-0079591, filed on Aug. 18, 2010 and patent application Ser. No. 10-2011-0082181, filed on Aug. 18, 2011 in Korea, the entire contents of which are incorporated herein by reference. In addition, this non-provisional application claims priority in countries, other than the U.S., with the same reason based on the Korean Patent Applications, the entire contents of which are hereby incorporated by reference.

The invention claimed is:

1. An image encoding apparatus comprising:
an image encoder configured to
select a reference picture for predicting a current block from among a plurality of reference picture candidates, the plurality of reference picture candidates being set in a unit of (i) the current block or (ii) an image area in which the current block is located,
determine a motion vector of the current block, the motion vector of the current block being used for identifying a predicted block of the current block in the selected reference picture, and
encode the current block by encoding, into a bitstream, (i) a reference index of the selected reference picture and (ii) information on the determined motion vector; and
a reference picture indexer configured to assign, based on an indexing order of the plurality of reference picture candidates, the reference index to the selected reference picture for identifying the selected reference picture from among the plurality of reference picture candidates, the indexing order being determined adaptively in the unit of (i) the current block or (ii) the image area,
wherein the indexing order is determined, irrespective of a temporal order of the plurality of reference picture candidates.

2. A reference picture indexing apparatus for indexing a selected reference picture for determining a motion vector of a current block, the motion vector of the current block being used for identifying a predicted block of the current block in the selected reference picture, the reference picture indexing apparatus comprising:
a candidate reference picture setting unit configured to set a plurality of reference picture candidates in a unit of (i) the current block or (ii) an image area in which the current block is located;

a priority order determining unit configured to adaptively determine an indexing order of the plurality of reference picture candidates in the unit of (i) the current block or (ii) the image area;

a reference picture indexing unit configured to assign, based on the indexing order, a reference index to the selected reference picture for identifying the selected reference picture from among the plurality of reference picture; and an index encoding unit configured to encode the reference index into a bitstream, wherein the indexing order is determined, irrespective of a temporal order of the plurality of reference picture candidates.

3. The reference picture indexing apparatus of claim 2, wherein the priority order determining unit determines the indexing order based on at least one of (i) a quantization parameter of the current block or the image area, (ii) a partition type of the current block, (iii) a size of the current block, (iv) an SAD (sum of absolute difference) between the current picture and the selected reference picture, (v) an inter-picture distance, (vi) an SSE (sum of square error) between the current picture and the selected reference picture, (vii) a direction of the reference picture, (viii) an interpolation resolution of the selected reference picture, and (ix) an encoding resolution of the selected reference picture, wherein the reference index is encoded by selecting a codeword corresponding to the selected reference picture from a codeword table specifying codewords and corresponding reference indexes, and wherein the codeword table has different codewords assigned to a plurality of reference indexes corresponding to the plurality of reference picture candidates, and lengths of codewords in the codeword table for at least two reference indexes among the plurality of reference indexes are set to be different each other based on the indexing order.

4. The reference picture indexing apparatus of claim 2, wherein the priority order determining unit determines the indexing order based on at least one of (i) a quantization parameter of the current block or the image area when a partition type of the current block is larger than a predetermined size, or (ii) a distance between a current picture and the selected reference picture when the partition type of the current block is smaller than the predetermined size.

5. The reference picture indexing apparatus of claim 2, wherein the priority order determining unit determines the indexing order in an ascending order of an SAD between a current picture and the plurality of reference picture candidates.

6. The reference picture indexing apparatus of claim 2, wherein for the plurality of reference picture candidates in a B-picture coding structure or for encoding by bidirectional prediction in inter prediction, the priority order determining unit assigns a same reference index to reference pictures of an L0 direction and an L1 direction.

7. An image decoding apparatus comprising:

a reference picture indexer configured to decode index information from a bitstream, for determining a reference picture for predicting a current block from among a plurality of reference picture candidates, the plurality of reference picture candidates being set in a unit of (i) the current block or (ii) an image area in which the current block is located, assign, based on an indexing order of the plurality of reference picture candidates, a plurality of reference indexes to the plurality of reference picture candidates, the indexing order being determined adaptively in the unit of (i) the current block or (ii) the image area, select a reference index from among the plurality of reference indexes based on the index information, and determine the reference picture corresponding to the selected reference index, from among the plurality of reference picture candidates; and an image decoder configured to reconstruct a motion vector of the current block based on the determined reference picture, and reconstruct the current block based on the motion vector of the current block and the determined reference picture, wherein the indexing order is determined, irrespective of a temporal order of the plurality of reference picture candidates.

8. The image decoding apparatus of claim 7, wherein the reference picture indexer determines the indexing order based on at least one of (i) a quantization parameter of the current block or the image area, (ii) a partition type of the current block, (iii) a size of the current block, (iv) an SAD (sum of absolute difference) between a current picture and the determined reference picture, (v) an inter-picture distance, (vi) an SSE (sum of square error) between a current picture and the determined reference picture, (vii) a direction of the determined reference picture, (viii) an interpolation resolution of the determined reference picture, and (ix) an encoding resolution of the determined reference picture, wherein the selected reference index is determined, by using a codeword included in the index information, from a codeword table specifying codewords and corresponding reference indexes, and wherein the codeword table has different codewords assigned to the plurality of reference indexes corresponding to the plurality of reference picture candidates, and lengths of codewords in the codeword table for at least two reference indexes among the plurality of reference indexes are set to be different each other based on the indexing order.

9. A reference picture indexing apparatus used in an image decoder, comprising:

a candidate reference picture setting unit configured to set a plurality of reference picture candidates in a unit of (i) a current block or (ii) an image area in which the current block is located;

a priority order determining unit configured to adaptively determine an indexing order of the plurality of reference picture candidates in the unit of (i) the current block or the image area;

a reference picture indexing unit configured to assign, based on the indexing order, a plurality of reference indexes to the plurality of reference picture candidates; and an index decoding unit configured to decode, from a bitstream, index information for select a reference index from among the plurality of reference indexes, wherein a reference picture for predicting the current block is determined from the plurality of reference picture candidates based on the selected reference index, wherein the indexing order is determined, irrespective of a temporal order of the plurality of reference picture candidates.

10. The reference picture indexing apparatus of claim 9, wherein the priority order determining unit determines the indexing order on at least one of (i) a quantization parameter of the current block or the image area, (ii) a partition type of the current block, (iii) a size of the current block, (iv) an SAD (sum of absolute difference) between a current picture and the determined reference picture, (v) an inter-picture distance, (vi) an SSE (sum of square error) between a current picture and the determined reference picture, (vii) a direction of the determined reference picture, (viii) an interpolation resolution of the determined reference picture, and (ix) an encoding resolution of the determined reference picture, wherein the selected reference index is determined, by using a codeword included in the index information, from a codeword table specifying codewords and corresponding reference indexes, and wherein the codeword table has different codewords assigned to the plurality of reference indexes corresponding to the plurality of reference picture candidates, and lengths of codewords in the codeword table for at least two reference indexes among the plurality of reference indexes are set to be different each other based on the indexing order.

11. The reference picture indexing apparatus of claim 9, wherein the priority order determining unit determines the indexing order based on at least one of (i) a quantization parameter of the current block or the image area when a partition type of the current block is larger than a predetermined size, or (ii) a distance between a current picture and the determined reference picture when the partition type of the current block is smaller than the predetermined size.

12. The reference picture indexing apparatus of claim 9, wherein the priority order determining unit determines the indexing order in an ascending order of an SAD between a current picture and the plurality of reference picture candidates.

13. An image encoding method comprising:

selecting a reference picture for predicting a current block from among a plurality of reference picture candidates, the plurality of reference picture candidates being set in a unit of (i) the current block or (ii) an image area in which the current block is located;

determining a motion vector of the current block, the motion vector of the current block being used for identifying a predicted block of the current block in the selected reference picture;

encoding the current block by encoding, into a bitstream, (i) a reference index of the selected reference picture and (ii) information on the determined motion vector; and assigning, based on an indexing order of the plurality of reference picture candidates, the reference index to the selected reference picture for identifying the selected reference picture from among the plurality of reference picture candidates, the indexing order being determined adaptively in the unit of (i) the current block or (ii) the image area, wherein the indexing order is determined, irrespective of a temporal order of the plurality of reference picture candidates.

14. A reference picture indexing method for indexing a selected reference picture for determining a motion vector of a current block, the motion vector of the current block being used for identifying a predicted block of the current block in the selected reference picture, the reference picture indexing method comprising:

setting a plurality of reference picture candidate in a unit of (i) the current block or (ii) an image area in which the current block is located;

adaptively determining an indexing order of the plurality of reference picture candidates in the unit of (i) the current block or (ii) the image area;

assigning, based on the indexing order, a reference index to the selected reference picture for identifying the selected reference picture from among the plurality of reference picture candidates; and encoding the reference index into a bitstream, wherein the indexing order is determined, irrespective of a temporal order of the plurality of reference picture candidates.

15. The reference picture indexing method of claim 14, wherein the process of setting the plurality of reference picture candidates sets the plurality of reference picture candidates in a B-picture coding structure.

16. The reference picture indexing method of claim 14, wherein the process of setting the plurality of reference picture candidates sets the plurality of reference picture candidates in a P-picture coding structure.

17. The reference picture indexing method of claim 14, wherein the process of setting the plurality of reference picture candidates sets the plurality of reference picture candidates in an inter prediction-based coding structure.

18. The reference picture indexing method of claim 14, wherein the process of adaptively determining the indexing order determines the indexing order based on at least one of (i) a quantization parameter of the current block or the image area, (ii) a partition type of the current block, (iii) a size of the current block, (iv) an SAD (sum of absolute difference) between a current picture and the selected reference picture, (v) an inter-picture distance, (vi) an SSE (sum of square error) between a current picture and the selected reference picture, (vii) a direction of the selected reference picture, (viii) an interpolation resolution of the selected reference picture, and (ix) an encoding resolution of the selected reference picture, wherein the reference index is encoded by selecting a codeword corresponding to the selected reference picture from a codeword table specifying codewords and corresponding reference indexes, and wherein the codeword table has different codewords assigned to a plurality of reference indexes corresponding to the plurality of reference picture candidates, and lengths of codewords in the codeword table for at least two reference indexes among the plurality of reference indexes are set to be different each other based on the indexing order.

19. The reference picture indexing method of claim 14, wherein the process of adaptively determining the indexing order determines the indexing order based on at least one of (i) a quantization parameter of the current block or the image area when a partition type of the current block is larger than a predetermined size, or (ii) a distance between a current picture and the selected reference picture when the partition type of the current block is smaller than the predetermined size.

20. The reference picture indexing method of claim 14, wherein the process of adaptively determining the indexing order determines the indexing order in an ascending order of an SAD between a current picture and the plurality of reference picture candidates.

21. The reference picture indexing method of claim 14, wherein for the plurality of reference picture candidates in a B-picture coding structure or for encoding by bidirectional prediction in inter prediction, the process of adaptively determining the indexing order assigns a same reference index to reference pictures of an L0 direction and an L1 direction.

22. An image decoding method comprising:
- decoding index information from a bitstream, for determining a reference picture for predicting a current block from among a plurality of reference picture candidates, the plurality of reference picture candidates being set in a unit of (i) the current block or (ii) an image area in which the current block is located;
- assigning, based on an indexing order of the plurality of reference picture candidates, a plurality of reference indexes to the plurality of reference picture candidates, the indexing order being determined adaptively in the unit of (i) the current block or (ii) the image area;
- selecting a reference index from among the plurality of reference indexes based on the index information;
- determining the reference picture corresponding to the selected reference index, from among the plurality of reference picture candidates;
- reconstructing a motion vector of the current block based on the determined reference picture; and
- reconstructing the current block based on the motion vector of the current block and the determined reference picture,
- wherein the indexing order is determined, irrespective of a temporal order of the plurality of reference picture candidates.

23. The image decoding method of claim 22, wherein the indexing order is determined based on at least one of (i) a quantization parameter of the current block or the image area, (ii) a partition type of the current block, (iii) a size of the current block, (iv) an SAD (sum of absolute difference) between a current picture and the determined reference picture, (v) an inter-picture distance, (vi) an SSE (sum of square error) between a current picture and the determined reference picture, (vii) a direction of the determined reference picture, (viii) an interpolation resolution of the determined reference picture, and (ix) an encoding resolution of the determined reference picture,
- wherein the selected reference index is determined, by using a codeword included in the index information, from a codeword table specifying codewords and corresponding reference indexes, and
- wherein the codeword table has different codewords assigned to the plurality of reference indexes corresponding to the plurality of reference picture candidates, and lengths of codewords in the codeword table for at least two reference indexes among the plurality of reference indexes are set to be different each other based on the indexing order.

24. The image decoding method of claim 22, wherein the index information is extracted from the bitstream in units of a slice, an image sequence, or a picture.

25. The image decoding method of claim 22, wherein the indexing order is extracted from the bitstream in units of a slice, an image sequence, or a picture.

* * * * *